United States Patent
O'Brien et al.

(10) Patent No.: US 12,271,928 B2
(45) Date of Patent: Apr. 8, 2025

(54) SYSTEMS AND METHODS FOR DELIVERY OF ADVERTISEMENTS RELATED TO PUBLIC ANNOUNCEMENTS ONBOARD MOBILE VEHICLES

(71) Applicant: ViaSat, Inc., Carlsbad, CA (US)

(72) Inventors: Ultan O'Brien, Carrickmines (IE);
Fergal Murray, Tomhaggard (IE);
Niall O'Sullivan, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 18/246,167

(22) PCT Filed: Sep. 22, 2020

(86) PCT No.: PCT/US2020/051959
§ 371 (c)(1),
(2) Date: Mar. 21, 2023

(87) PCT Pub. No.: WO2022/066141
PCT Pub. Date: Mar. 31, 2022

(65) Prior Publication Data
US 2023/0368244 A1 Nov. 16, 2023

(51) Int. Cl.
*G06Q 30/02* (2023.01)
*G06Q 30/0251* (2023.01)

(52) U.S. Cl.
CPC ..... *G06Q 30/0265* (2013.01); *G06Q 30/0269* (2013.01)

(58) Field of Classification Search
CPC .......... B64D 11/0015; B64D 11/00155; B64D 11/0624; B64D 2045/007; B64D 45/00; B64D 2011/0053; B64D 2231/025; B64D 11/00; B64D 11/062; B64D 11/00153; B64D 11/00152; B64D 47/00;
(Continued)

(56) References Cited

U.S. PATENT DOCUMENTS 6,810,527 B1 10/2004 Conrad et al.
10,575,029 B1 * 2/2020 Lai ................... H04N 21/2223
(Continued)

FOREIGN PATENT DOCUMENTS

WO  WO 2020/131079      6/2020
WO  WO-2020236672 A1 * 11/2020

OTHER PUBLICATIONS

International Search Report and Written Opinion for PCT/US2020/051959, dated Nov. 20, 2020, 12 pages, Rijswijk, NL.

*Primary Examiner* — Vincent M Cao
(74) *Attorney, Agent, or Firm* — Thorpe North & Western, LLP.

(57) ABSTRACT

Technology is described for providing electronic advertisements on an aircraft. A server onboard the aircraft may receive a notification that a public announcement is occurring on the aircraft. The server may identify an announcement tag associated with the public announcement. The server may select an electronic advertisement based in part on the announcement tag associated with the public announcement. The electronic advertisement may be selected from a data store of electronic advertisements. The server may send the electronic advertisement to a client device to be displayed via a graphical user interface on the client device after the public announcement is finished.

48 Claims, 8 Drawing Sheets

(58) Field of Classification Search
CPC .......... B64D 11/00151; B64D 11/0023; B64D 2045/0065; B64D 2045/0075; B64D 2045/0085; B64D 45/0005; B64D 45/0053; B64D 45/04; H04N 21/2146; H04N 7/181; H04N 21/41422; H04N 21/414; H04H 20/62; H04W 4/42
See application file for complete search history.

(56) References Cited

U.S. PATENT DOCUMENTS

| | | | |
|---|---|---|---|
| 10,897,652 B1* | 1/2021 | Atkins | H04N 21/41422 |
| 11,023,924 B1* | 6/2021 | LeFlohic | G06Q 30/0252 |
| 2001/0034651 A1* | 10/2001 | Marks | G06Q 30/0241 |
| | | | 705/14.38 |
| 2006/0095162 A1* | 5/2006 | Schafer, Jr. | B64D 47/02 |
| | | | 700/275 |
| 2015/0317682 A1* | 11/2015 | Kayser | G06Q 30/0267 |
| | | | 705/14.58 |
| 2018/0123679 A1* | 5/2018 | Hansen | H04W 4/42 |
| 2019/0039734 A1* | 2/2019 | Shah | G09F 21/00 |
| 2019/0273964 A1* | 9/2019 | Couleaud | H04H 60/46 |
| 2019/0303978 A1* | 10/2019 | Zacharatos | G06Q 50/01 |
| 2020/0002024 A1* | 1/2020 | Johannessen | B64D 45/00 |
| 2020/0068358 A1* | 2/2020 | Macrae | B64D 11/00155 |
| 2020/0097169 A1* | 3/2020 | Diaz | G06F 3/04817 |
| 2020/0169844 A1* | 5/2020 | Forest | B64D 47/02 |

* cited by examiner

# SYSTEMS AND METHODS FOR DELIVERY OF ADVERTISEMENTS RELATED TO PUBLIC ANNOUNCEMENTS ONBOARD MOBILE VEHICLES

BACKGROUND

Public announcements may be provided on mobile vehicles, such as aircraft, ships, cruise ships, buses, trains, etc. Public announcements may include, but are not limited to, food and beverage announcements, boutique and duty free announcements, pre-landing announcements, pre-take-off announcements, safety announcements, pilot or captain announcements, turbulence announcements, pre-docking announcements, etc.

In one example, a crew member onboard the mobile vehicle may deliver the public announcement by speaking into a microphone, and the public announcement may be provided over a loudspeaker system on the mobile vehicle. In another example, the crew member may select a pre-recorded public announcement using a crew interface onboard the mobile vehicle, and the selected public announcement may be provided over the loudspeaker system on the mobile platform. For example, the mobile vehicle may host a data store of pre-recorded public announcements related to food and beverage services, takeoff and landing, safety, etc., and pre-recorded public announcements may be selected from the data store for playback.

SUMMARY

A method for playing electronic advertisements on an aircraft is provided. The method may include receiving, at a server onboard the aircraft, a notification that a public announcement is occurring on the aircraft. The method may include identifying, at the server, an announcement tag associated with the public announcement. The method may further include selecting, at the server, an electronic advertisement based in part on the descriptor associated with the public announcement. The electronic advertisement may be selected from a data store of electronic advertisements. The method may include sending, from the server, the electronic advertisement to a client device to be presented via a graphical user interface on the client device after the public announcement is finished.

A non-transitory machine readable storage medium having instructions embodied thereon is provided. The instructions when executed by one or more processors, cause the one or more processors to perform a process. The process may include receiving, at a server onboard the aircraft, a notification that a public announcement is occurring on the aircraft. The process may include identifying, at the server, an announcement tag associated with the public announcement. The process may include selecting, at the server, an electronic advertisement based in part on the announcement tag associated with the public announcement. The electronic advertisement may be retrieved from a data store of electronic advertisements. The process may include transmitting the electronic advertisement from the server to a client device in order for the electronic advertisement to be displayed using a graphical user interface on the client device.

A system is provided that may include at least one processor and at least one memory device including a data store to store a plurality of data and instructions. The plurality of data and instructions, when executed, cause the system to receive a notification from an aircraft data bus that a public announcement is occurring on an aircraft. The system may identify an announcement tag associated with the public announcement. The system may select an electronic advertisement based in part on the announcement tag associated with the public announcement. The electronic advertisement may be selected and/or retrieved from a data store of electronic advertisements onboard the aircraft. The plurality of data and instructions, when executed, cause the system to send the electronic advertisement to a client device to be presented via a graphical user interface on the client device after the public announcement is finished.

DETAILED DESCRIPTION

Figure 1A:
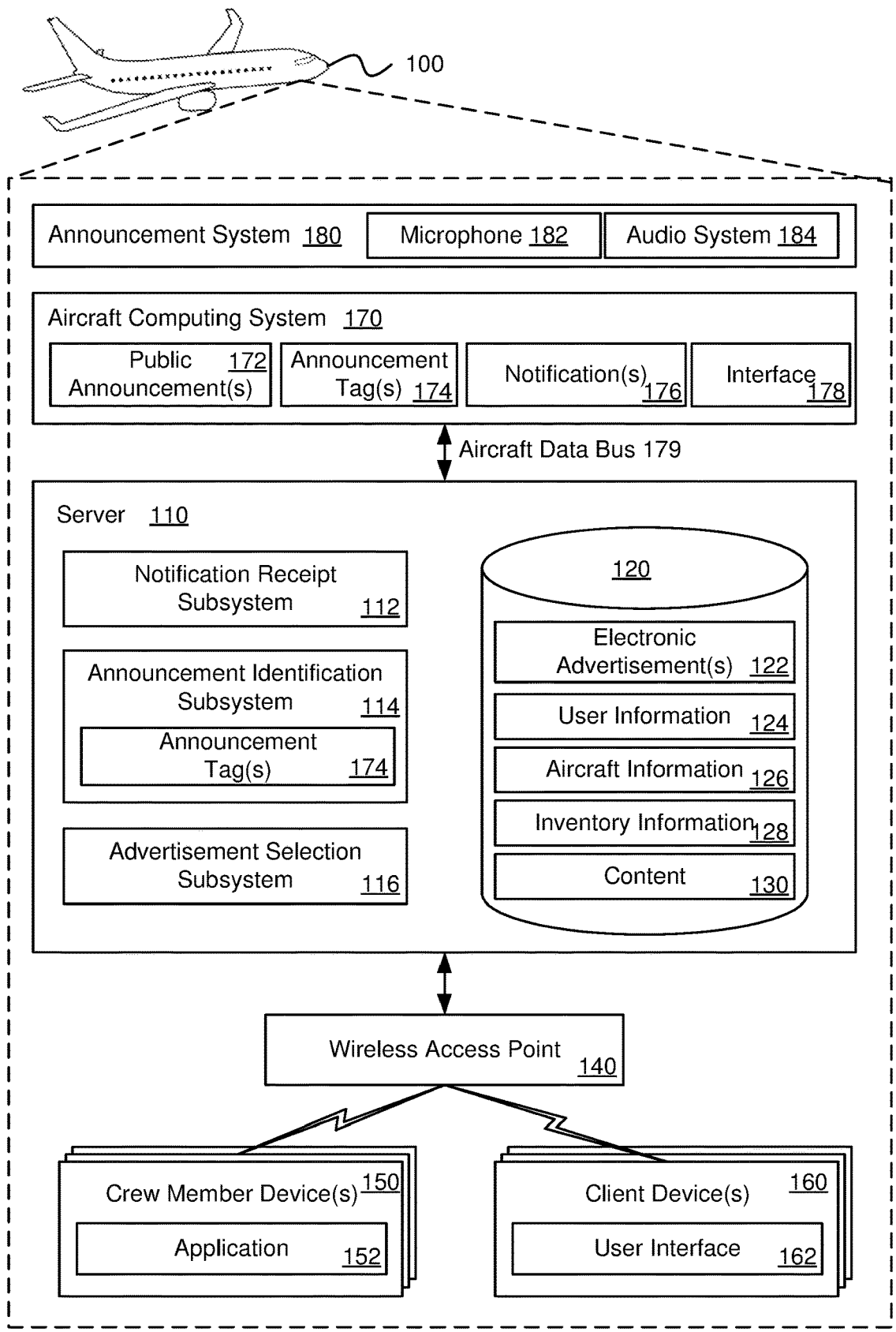
FIG. 1A is a block diagram illustrating a system for providing electronic advertisements on an aircraft according to an example of the present technology.

FIG. 1A illustrates an example of a system for providing electronic advertisements 122 to a client device 160 on an aircraft 100 based on a public announcement 172 on the aircraft 100. In one example, the electronic advertisement 122 may be provided to the client device 160 based on a public announcement 172 that is currently occurring on the aircraft 100. In an alternative example, the electronic advertisement 122 may be provided after the public announcement 172 has occurred on the aircraft 100. The aircraft 100 may be one of multiple aircraft which are included in a fleet of aircraft. In a specific operational example, a server 110 onboard the aircraft 100 may select and retrieve electronic advertisements 122 from a data store 120 based on one or more announcement tag(s) 174 associated with the public announcement 172. The data store 120 may locally store the electronic advertisements 122 onboard the aircraft 100. The server 110 may transmit the electronic advertisements 122 to client device(s) 160 via a wireless access point 140 (e.g., a Wi-Fi router, Bluetooth connection, etc.), where the client device(s) 160 and the wireless access point 140 may be onboard the aircraft 100. The client device(s) 160 may receive the electronic advertisements 122 for presentation via a user interface 162 after the public announcement 172 has ended. As an example, presentation of the electronic advertisement 122 may include execution of a video player, image viewer, Java application or web application on the client device 160.

In one example, the public announcements 172 may be categorized as audio-only public announcements, audio-visual public announcements (e.g., video or animations), text public announcements, live audio public announcements, pre-recorded audio or video public announcements, etc. Examples of the public announcements 172 may include, but are not limited to, a food and beverage announcement, a boutique or duty free announcement, a pre-landing announcement, a pre-takeoff announcement, a safety announcement, a pilot or crew member announcement, a turbulence announcement, a docking announcement, etc.

In one example, one or more announcement tags 174 may be used to retrieve the electronic advertisements 122 from the data store 120. An announcement tag 174 may be a single value. For example, the announcement tag 174 may be a single value (e.g., a numeric value or an alpha-numeric value) that represents a type of public announcement 172, such as turbulence, safety, food service, etc. As a non-limiting example, the announcement tag 174 may be a numeric value of '0001', which may indicate turbulence. As another non-limiting example, the announcement tag 174 may be an alpha-numeric value of 'SA_0002', which may indicate safety. The value may be looked up in a lookup table to determine the type of public announcement 172 (e.g., turbulence, safety, foodh service) associated with the value. Further, the announcement tag 174 may be a single descriptor, category, attribute or key-value pair that indicates the type of public announcement 172. In other words, the announcement tag 174 may include a descriptor, category, attribute, etc., associated with the public announcement 172.

In one example, a given announcement tag 174 may be a compound value (e.g., the announcement tag 174 may include or be associated with one or more values). For example, the announcement tag 174 may include a compound list of values (e.g., numeric values or alpha-numeric values). As another example, the announcement tag 174 may include a compound list of descriptors, categories, attributes or key-value pairs that indicates the type of public announcement 172. The compound list may include key words, terms, phrases, values, etc. that describe the public announcement 172.

In one example, one or more announcement tags 174 may be used to retrieve the electronic advertisements 122 from the data store 120. In this case, each announcement tag 174 may have a single piece of data about the public announcement 172. As a non-limiting example, a first announcement tag 174 may include a single alpha-numeric value that indicates the type of public announcement 172, a second announcement tag 174 may include compound values that indicate an attribute of public announcement 172 (e.g., version 2 of the food and beverage announcement), and so on.

The electronic advertisements 122 may be related to products, services, offers, promotions, coupons, etc. The electronic advertisements 122 are digital electronic advertisements that may be composed of digital video, digital audio, digital text, digital animation, digital images, executable objects, applications, games, etc. The electronic advertisements 122 may be banner advertisements, rich media advertisements, pop-up advertisements, floating advertisements, wallpaper advertisements, video advertisements, expanding advertisements, etc. Each electronic advertisement 122 may be associated with one or more attribute fields (e.g., metadata, keywords, descriptors, etc.) stored in the data store 120. The server 110 may select the electronic advertisements 122 from the data store 120 by matching some or all of the information from one or more data fields of the announcement tag 174 or from the compound data fields of the announcement tag(s) (e.g., descriptors, category, attributes) with the one or more attributes associated with the electronic advertisements 122. This may be done by comparing the announcement tag 174 or the data fields of the announcement tag 174 with the attributes associated with the electronic advertisements 122, and based on the comparison, selecting electronic advertisements 122 that are related to the public announcement 172.

In one example, the announcement tag 172 may be a unique identifier (e.g., a numerical identifier). The unique identifier may be searched for in a table of identifiers stored in the data store 120 in order to identify the category of the public announcement 172 associated with the announcement tag 172. For example, a first numerical identifier may be associated with a first public announcement, and a search of the table of identifiers for the first numerical identifier may result in an indication that the first public announcement is in the category of safety. In another example, a second numerical identifier may be associated with a second public announcement, and a search of the table of identifiers for the second numerical identifier may result in an indication that the second public announcement is in the category of turbulence. As a result, one advertisement may be selected when a public safety announcement is made but a different advertisement or no advertisement may be selected when a turbulence public announcement is made.

The client device 160 may be a personal electronic device, such as a mobile phone, a tablet computer, laptop computer, etc., and a connection between the client device 160 and the server 110 may be a wireless connection established via the wireless access point 140. In another example, the client device 160 may be a seatback system installed on a passenger seat of the aircraft 100, and a connection between the client device 160 and the server 110 may be a wired or wireless connection.

In examples described herein, the techniques are in the context of an aircraft. Alternatively, the techniques described for providing electronic advertisements 122 may be provided to a client device 160 on another type of mobile platform, such as a ship, bus, train, helicopter, car, group of motorcycles, hovercraft, spacecraft, etc.

In one example, a crew member onboard the aircraft 100 may initiate the public announcement 172 to be made on the aircraft 100. The crew member may initiate the public announcement 172 to be made manually via an announcement system 180 on the aircraft. Alternatively, the crew member may initiate the public announcement 172 to be made in an automated manner through an aircraft computing system 170 on the aircraft 100 (e.g., a manually activated recorded public announcement or via a timed or event driving activation as described more later). When using the announcement system 180, the crew member may speak the public announcement 172 into a microphone 182 of the announcement system 180, and the public announcement 172 may be audible to passengers on the aircraft 100 using an audio system 184 of the announcement system 180. The audio system 184 may include a plurality of loudspeakers that are distributed throughout the aircraft 100. In this example, the crew member may talk into the microphone 182, and corresponding audio may be heard by the passengers on the aircraft 100 via the audio system 184. As a non-limiting example, the crew member may announce when the aircraft 100 is starting to descend or when a food and beverage service is about to commence on the aircraft 100.

In an alternative example, when the crew member speaks the public announcement 172 into the microphone 182, the corresponding audio may be directly provided to the client device 160 over the wireless access point 140 and/or a wired connection. For example, a user associated with the client device 160 may hear the audio of the public announcement 172 via a speaker of the client device 160 or through headphones connected to the client device 160.

As described in further detail below, when the public announcement 172 is done manually on the aircraft, announcement tag(s) 174 to be associated with the public announcement 172 may be manually entered or selected by the crew member using a user interface. For example, announcement tags 174 may be entered or selected to include the information that a given public announcement 172 is related to safety, turbulence, take-off, landing, etc.

In another example, when using the aircraft computing system 170, a plurality of pre-recorded public announcements 172 may be stored on the aircraft computing system 170. The aircraft computing system 170 may be a computing system located on the aircraft 100. The aircraft computing system 170 may be responsible for storing the public announcements 172 that are pre-recorded as well as performing other aircraft-related operations. The pre-recorded public announcements 172 may include one or more corresponding announcement tag(s) 174. The announcement tags 174 may each represent an individual portion of data associated with the announcement or the announcement tags 174 may be compound tags that include descriptors, categories, attributes, identifiers, etc. associated with the public announcement 172. A specific example of an announcement tag 174 may be a simple data field (e.g., a numeric value or alpha-numeric value) or the announcement tag 174 may include a field name (e.g., a tag name) and corresponding field data, in a key-value arrangement. In addition, the corresponding field data may include a listing of key-values that represent a descriptor, category, attribute, identifier, etc. The announcement tags 174 may include key words, terms, phrases, values, etc. that describe the public announcement 172. For example, the announcement tags 174 may be alpha-numeric values that represent: turbulence, safety, food service, etc. In addition, the announcement tags 174 for the public announcements 172 which are pre-recorded may be entered manually or created programmatically, for example, using voice recognition, image recognition, video recognition, etc.

In one example, the crew member may select one of the pre-recorded public announcements 172 for immediate playback using an interface 178 of the aircraft computing system 170. As a non-limiting example, the crew member may select a pre-recorded public announcement about buckling a seatbelt for immediate playback via the interface 178. In another example, the crew member may use the interface 178 to program a certain pre-recorded public announcement 172 to be presented at a predefined time or when a certain type of event occurs. As a non-limiting example, the crew member may program a safety announcement to be presented at a predefined aircraft take-off time. As another non-limiting example, the crew member may program a public announcement about Wi-Fi availability when a certain event occurs or a certain condition is satisfied (e.g., the aircraft 100 reaches an altitude of 10,000 feet). In another example, the crew member may select one of the pre-recorded public announcements 172 for immediate playback using a user interface of an application 152 that executes on a crew member device 150.

In one example, when the public announcement 172 is a pre-recorded audio announcement, the public announcement 172 may be played using the audio system 184 on the aircraft 100. In this example, the public announcement 172 may be played on the plurality of loudspeakers that are distributed throughout the aircraft 100. In an alternative example, the public announcement 172 may be provided to the user interface 162 of the client device 160 via the wireless access point 140. In this case, the public announcement 172 may be an audio and/or video announcement. As a non-limiting example, the public announcement 172 may be a safety demonstration video that is provided to the client device 160 prior to take-off. The public announcement 172 may interrupt or pause content 130 (e.g., movies, television programs, moving map information, shopping information, etc.) that is currently being provided to the client device 160 via the user interface 162, and delivery of the content 130 may resume after the public announcement 172 has ended. The user interface 162 may be associated with an inflight application that executes on the client device 160, or alternatively, the user interface 162 may be provided when a browser is opened using the client device 160.

In one example, the content 130 may be provided for consumption to a user (e.g., a passenger) of the client device 160. Content 130 may for example be stored onboard the aircraft 100, such as on the server 110, and/or on another server onboard the aircraft 100. Examples of content 132 that may be stored onboard include data such as media content (e.g., music, videos, etc.) In another example, content 130 may additionally or alternatively be received via a wireless communication link from a remote server off-board the aircraft 100. Examples of content 130 that may be received via the wireless communication link include network data accessible via a network (e.g., the Internet) such as web browsing, text messaging, email messaging, and media content (e.g., music, videos, TV channels, etc.) that may be requested by the user.

In one configuration, irrespective of whether the public announcement 172 is initiated manually (e.g., by the crew member speaking into the microphone 182) or in the automated manner (e.g., by the crew member selecting a pre-recorded public announcement 172 for playback via the interface 178), the aircraft computing system 170 may send a notification 176 to the server 110 when the public announcement 172 is occurring on the aircraft 100. In other words, the aircraft computing system 170 may detect when the public announcement 172 is occurring and may send the notification 176 to the server 176. In some cases, the notification 176 may include the announcement tag(s) 174 associated with the public announcement 172. For example, when the public announcement 172 is initiated in the automated manner, the aircraft computing system 170 may send the notification 176, which may indicate that the public announcement 172 is currently being presented on the aircraft 100 and may include the announcement tag(s) 174 associated with the public announcement 172.

The aircraft computing system 170 may send the notification 176 (and optionally the announcement tags 174) to the server 110 via an aircraft data bus 179. The aircraft data bus 179 may operate according to a protocol such as an ARINC (Aeronautical Radio, INC.) avionics protocol, which may be used by the server 110 to read and record various status or operational events associated with the aircraft 100. The aircraft data bus 179 may be the connectors or set of wires that provide transportation for avionics data within the aircraft 100. The aircraft data bus 185 may use serial data transfer to minimize a size and weight of aircraft cabling.

In an alternative example, when the public announcement 172 is initiated manually, the notification 176 may not include the announcement tag(s) 174. Rather, the server 110 may receive the announcement tag(s) 174 from the crew member device 150. More specifically, when the public announcement 172 is initiated manually, the announcement tag(s) 174 may not be sent to the server 110 from the aircraft computing system 170. In this case, the announcement tag(s) 174 associated with the public announcement 172 may be received at the server 110 via the application 152 that executes on the crew member device 150 as directed by the crew member that makes the public announcement 172. For example, the crew member may select or input the announcement tag(s) 174 to be associated with the public announcement 172 using a user interface of the application 152 executing on the crew member device 150, prior to making the public announcement 172 or while the public announcement 172 is being made. The user interface may present a listing of possible announcement tags 174 (e.g., safety, food and beverage), in a user interface control (e.g., a drop-down list box, a text list, radio buttons, graphical buttons etc.) and the crew member may be prompted to select from the listing of possible announcement tags 174. In this case, the application 152 may send the announcement tag(s) 174 to the server 110 via the wireless access point 140.

In one example, a notification receipt subsystem 112 of the server 110 may receive the notification 176 from the aircraft computing system 170 via the aircraft data bus 179. The notification receipt subsystem 112 may also receive the announcement tag 174 from the aircraft computing system 170 via the aircraft data bus 179, or from the application 152 executing on the crew member device 150 via the wireless access point 140.

In one example, an announcement identification subsystem 114 of the server 110 may identify the announcement tag 174 associated with the public announcement 172. For example, the announcement identification subsystem 114 may receive the announcement tag 174 via the aircraft data bus 178 or from the crew member device 150 as directed by a crew member.

In yet another example, the public announcement 172 may be initiated manually, and a voice recognition subsystem may perform voice recognition of the public announcement 172 and generate announcement tag(s) 174 to be associated with the public announcement 172 based on the voice recognition. In this example, the voice recognition subsystem may send the announcement tag(s) 174 to the announcement identification subsystem 114.

In one configuration, an advertisement selection subsystem 116 of the server 110 may select an electronic advertisement 122 from the data store 120 based in part on the announcement tag 174 associated with the public announcement 172. For example, the advertisement selection subsystem 116 may identify one or more electronic advertisements 122 in the data store 120 using the announcement tag 174 itself, or alternatively, the advertisement selection subsystem 116 may identify one or more electronic advertisements 122 in the data store 120 corresponding to the descriptor, category, attributes, or other information indicated by the announcement tag 174. In another example, the advertisement selection subsystem 116 may identify one or more electronic advertisements 122 in the data store 120 based on the voice recognition of the announcement tag 174, which may be performed to determine the descriptor, category, attributes, or other information indicated by the announcement tag 174. The advertisement selection subsystem 116 may select one of the one or more electronic advertisements 122 identified from the data store 120. The electronic advertisement 122 may be sent from the server 110 to the client device 160 via the wireless access point 140. The electronic advertisement 122 may be presented on the user interface 162 of the client device 160 after the public announcement 172 has finished. The electronic advertisement 122 may be a banner advertisement, rich media advertisement, pop-up advertisement, floating advertisement, wallpaper advertisement, video advertisement, or an expanding advertisement. The electronic advertisement 122 may be for products, services, offers, promotions, coupons, etc.

In one example, after the user associated with the client device 160 boards the aircraft 100, the server 110 may establish a connection with the client device 160 via the wireless access point 140. The client device 160 may be carried by the user within the aircraft 100. The user may provide login information (e.g., user credentials, such as a user name and password) via the user interface 162 to establish the connection between the client device 160 and the server 110. In another example, the connection between the client device 160 and the server 110 may be established once the client device 160 connects to the wireless access point 140. The user interface 162 may enable the user to consume the content 130, such as movies, television programs, music, electronic games, moving map information, shopping content, destination content, etc. In one example, the user may provide the login information via the user interface 162 when the aircraft 100 is on the ground or after the aircraft 100 reaches a certain altitude (e.g., 10,000 feet).

When the public announcement 172 is occurring on the aircraft 100, the client device 160 may receive an indicator about the public announcement 172 from the server 110. More specifically, content 130 (e.g., stored media content, web browsing content, data content) being provided to the client device 160 via the user interface 162 may be paused while the public announcement 172 is occurring, and an announcement indicator may be displayed on the user interface 162. For example, the announcement indicator may be displayed as an overlay on the paused content 130. The announcement indicator may notify the user of the client device 160 that the public announcement 172 is occurring, as well as a brief description of the public announcement 172 (e.g., a food and beverage announcement). After the public announcement 172 has ended, the content 130 may be resumed and the electronic advertisement 122 that was selected may be displayed on the user interface 162. For example, the electronic advertisement 122 may be displayed on a portion of the user interface 162, and the user may have an ability to interact with the electronic advertisement 122 to receive additional information or close the electronic advertisement 122. As another example, the electronic advertisement 122 may be displayed as an overlay, and the user may have an ability to close the electronic advertisement 122 or interact with the electronic advertisement 122 to receive additional information.

In another example, the content 130 may not resume until the user views the electronic advertisement 122. For example, when the electronic advertisement 122 is a video advertisement, the content 130 may not be resumed until the video advertisement is completed. As another example, when the electronic advertisement 122 is a pop-up advertisement or a floating window advertisement, the content 130 may not be resumed until the electronic advertisement 122 is closed or exited by the user.

As a non-limiting example, a crew member may announce over the microphone 182 that crew members on the aircraft 100 will be offering duty free sales to passengers on the aircraft 100. Prior to, during or after the crew member makes the announcement, the crew member may login to the application 152 on: their crew member device 150, the announcement system 180 or the aircraft computing system 170 and input an announcement tag 174 about the duty free sale announcement. For example, the crew member may select or enter the announcement tag 174 about the duty free sale announcement via a text box, drop-down menu, etc. displayed when the application 152 executes on the crew member device 150. In this example, the announcement identification subsystem 114 may identify the announcement tag 174 to be related to duty free sales based on the announcement tag 174 received from the crew member device 150. Further, the advertisement selection subsystem 116 may identify an electronic advertisement 122 based on the announcement tag 174 received about the duty free sale announcement.

As another non-limiting example, prior to a food and beverage service being offered on the aircraft 100, a crew member may select a pre-recorded public announcement about the food and beverage service to be presented on the aircraft 100. The crew member may select the pre-recorded public announcement for immediate playback via the interface 178 of the aircraft computing system 170. In this case, the pre-recorded public announcement may have a corresponding announcement tag 174, which may identify that the pre-recorded public announcement is related to food and beverage. In this example, the announcement identification subsystem 114 may identify the pre-recorded public announcement as being related to a food and beverage service based on the announcement tag 174. Further, the advertisement selection subsystem 116 may identify an electronic advertisement 122 (e.g., an electronic advertisement for a popular sandwich chain or an advertisement for a special sandwich available on-board for a fee) based on the announcement tag 174 associated with the pre-recorded public announcement for the food and beverage service.

In yet another non-limiting example, a crew member may program a pre-recorded public announcement about Wi-Fi availability on the aircraft 100 which may occur when the aircraft 100 reaches a certain altitude (e.g., 10,000 feet). The pre-recorded public announcement 172 may have a corresponding announcement tag 174, which may identify that the pre-recorded public announcement 172 is related to Wi-Fi availability and cost. In this example, playback of the pre-recorded public announcement may be triggered automatically when the certain altitude is reached. The automatic playback of the pre-recorded public announcement 172 when the certain altitude is reached may be set up by the crew member via the user interface 178 of the aircraft computing system 170 or via the application 152 that executes on the crew member device 150. When the certain altitude is reached, the advertisement selection subsystem 116 may identify an electronic advertisement 122 (e.g., an electronic advertisement for a paid movie that is accessible over Wi-Fi through an inflight entertainment system) based on the announcement tag 174 associated with the pre-recorded public announcement 172.

In one configuration, the advertisement selection subsystem 116 may select the electronic advertisement 122 from the data store 120 using the announcement tag 174, as well as by using user information 124 and/or aircraft information 126 to select the electronic advertisement 122. The user information 124 (or a user profile) may include itinerary information, demographic information and/or user interest information. The user information 124 may be specific to a particular user on the aircraft 100, whereas the aircraft information 126 may be applicable to the aircraft 100 as a whole.

The itinerary information may include, but is not limited to, a user travel origin (e.g., a geographic location at which the user began travel), a user travel destination (e.g., a geographic location to which the user is traveling), user dates of travel, a user ticket purchase class (e.g., first class, business class, economy class), a user seat location, a time of travel, a purpose of the travel (e.g., business or leisure), a day of the week of travel, a total duration of a trip, a user ticket price, a time between a flight booking time and an actual flight time, etc. The demographic information may include, but is not limited to, an age or age range, gender, languages spoken, socioeconomic status, education level, marital status, occupation, etc. associated with the user. The user interest information may include one or more preferences such as certain products that are of interest to the user (e.g., televisions, skis, and sports cars), activities that are of interest to the user (e.g., football, skiing, mountain climbing, and yoga), certain foods that are of interest to the user (e.g., steak, ramen), etc. In other words, the interest information may describe a behavioral attribute of the user (e.g., a propensity to consume certain types of content or perform certain types of activities). On the other hand, the aircraft information 126 may include, but is not limited to, a current location of the aircraft 100, a current route (source and/or destination) of the aircraft 100, an aircraft origin, an aircraft destination, an estimated arrival time, an arrival gate, a current latitude and longitude of the aircraft, an aircraft speed, etc. The aircraft information 126 may be received from the aircraft computing system 170 over the aircraft data bus 178.

In one example, the user information 124 and/or the aircraft information 126 may influence the electronic advertisement 122 that is selected by the advertisement selection subsystem 116. When the user information 124 is used to select the electronic advertisement 122, personalized electronic advertisements may be delivered on a per-user basis. In other words, for a given announcement tag 174 associated with a public announcement 172 which take place on the aircraft 100, the electronic advertisements 122 that are presented may be individualized based on a specific user's travel itinerary, demographic information, interests, etc. When the aircraft information 126 is used to select the electronic advertisement 122, electronic advertisements may be delivered on a per-aircraft basis. In other words, for a given announcement tag 174, the electronic advertisement 122 that is presented on the aircraft 100 may be tailored to the aircraft's destination, the aircraft's origin, etc.

In one configuration, the advertisement selection subsystem 116 may select the electronic advertisement 122 from the data store 120 using the announcement tag 174, as well as by using inventory information 128 for product inventory on the aircraft 100. The inventory information 128 may indicate a current inventory of products available on the aircraft 100. In a specific example, the inventory information 128 may include a listing of the number of food items, drink items, personal items (e.g., pillows, blankets), etc. that are available for request or purchase on the aircraft 100. The food items may include, but are not limited to, hot meals, sandwiches, snacks, etc. The drink items may include, but are not limited to, water, soda beverages, juice beverages, alcoholic beverages, etc. The personal items may include, but are not limited to, headphones, eye masks, face masks, hand sanitizer, blankets, pillows and toiletry or personal hygiene items such as lotions, soaps, etc. The inventory information 128 may be tracked and updated in real time to reflect an up-to-date listing of items or number of items that are available for request or purchase on the aircraft 100. In one example, the advertisement selection subsystem 116 may select an electronic advertisement 122 for an item included on the current inventory of items available on the aircraft 100, as indicated by the inventory information 128.

As an example, the announcement tag 174 may indicate that the public announcement 172 is associated with a food and beverage service being provided on the aircraft 100. In this example, the inventory information 128 may indicate that sandwiches on the aircraft 100 are out of inventory (e.g., zero sandwich inventory) but that there are pasta meals available. Therefore, the advertisement selection subsystem 116 may select an electronic advertisement 122 for a pasta meal that is available for purchase, as opposed to an electronic advertisement 122 for a sandwich that is no longer available, as indicated by the inventory information 128.

In one configuration, the advertisement selection subsystem 116 may use a machine learning model to select the electronic advertisement 122 based on the announcement tag 174, the user information 124 (e.g., the itinerary information, demographic information and/or interest information), the aircraft information 126 and/or the inventory information 128. In other words, the announcement tag 174, the user information 124, etc. may be inputs or features submitted to a previously trained machine learning model, and the machine learning model may produce an output that indicates the electronic advertisement 122 to be selected.

In one configuration, the advertisement selection subsystem 116 may select the electronic advertisement 122 by matching some or all of the information included in the announcement tag(s) 174, user information 124, aircraft information 126 and/or inventory information 128 with some or all of characteristics of the electronic advertisements 122 stored in the data store 120. This may be done by comparing the information included in the announcement tag(s) 174, user information 124, aircraft information 126 and/or inventory information 128 with the attribute fields of the electronic advertisements 122, and based on the comparison selecting electronic advertisements 122 that are customized for the user of the client device 160.

As an example, the machine learning model may be generated using supervised learning, unsupervised learning or reinforcement learning. The machine learning model may apply feature learning, sparse dictionary learning, anomaly detection, decision trees, association rules, heuristic rules, etc. to improve a performance of the machine learning model over time. In addition, the machine learning model may incorporate statistical models (e.g., regression), principal component analysis, neural networks, or any other type of artificial intelligence (AI).

In one example, a wireless connection between the server 110 and the client device(s) 160 and the crew member device(s) 150 may be established using Transmission Control Protocol/Internet Protocol (TCP/IP), and services in the server 110 may be web services that are RESTful. The wireless access point 140 that facilitates data traffic between the server, the client device(s) 160 and the crew member device(s) 150 may operate using a Wi-Fi protocol, a Bluetooth protocol or another appropriate wireless protocol.

The client device(s) 160 and the crew member device(s) 150 may comprise, for example, processor-based systems. The client device(s) 160 and the crew member device(s) 150 may be devices such as, but not limited to, laptops or notebook computers, tablet computers, mobile devices, handheld computers, or other devices with like capability. The client device(s) 160 and the crew member device(s) 150 may be mobile computing devices. The client device(s) 160 and the crew member device(s) 150 may be personal electronic devices or may be property of an aircraft operator. In another example, the client device(s) 160 and the crew member device(s) 150 may be seatback systems that are installed on passenger seats of the aircraft 100.

In one configuration, the server 110 may communicate with the client device(s) 160 and the crew member device(s) 150 via a network. The network may include any useful computing network, including a localized network, a wireless data network, or any other such network or combination thereof. Components utilized for such a system may depend at least in part upon the type of network and/or environment selected. Communication over the network may be enabled by wired or wireless connections and combinations thereof.

The various processes and/or other functionality contained within the server(s) 110 may be executed on one or more processors that are in communication with one or more memory modules. The server(s) 110 may include a number of computing devices that are arranged, for example, in one or more server banks or computer banks or other arrangements.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

FIG. 1A illustrates that certain processing modules or subsystems may be discussed in connection with this technology. In one example configuration, a module or subsystem may be considered a service with one or more processes executing on a server or other computer hardware. For example, modules or subsystems providing services may be considered on-demand computing that are hosted in a server. An application programming interface (API) may be provided for each module or subsystem to enable a second module or subsystem to send requests to and receive output from a first module or subsystem. Such APIs may also allow third parties to interface with the module or subsystem and make requests and receive output from the modules or subsystems.

While FIG. 1A illustrates an example of a system that may implement the techniques above, many other similar or different environments are possible. The example environments discussed and illustrated above are merely representative and not limiting.

In the past, electronic advertising on aircrafts was static and not targeted based on public announcements that were made on aircrafts. More specifically, in the past, electronic advertisements were not tailored to the combination of public announcements that occur on the aircraft, user information, aircraft information, etc. The same electronic advertisements have typically been shown to all of the users on the aircraft, regardless of the public announcements on the aircraft, a user's specific personal characteristics, a user's travel itinerary, aircraft information, a user's interests, etc. As a result, in the past, users (which include passengers) were often exposed to electronic advertisements that were unrelated to public announcements that may have occurred on the aircraft and were unrelated to the user's age, occupation, travel itinerary, interests, etc. These poorly-suited electronic advertisements could cause users to lose interest in the electronic advertisement altogether and/or skip the electronic advertisement if possible.

In the present technology, users on an aircraft may receive electronic advertisements that are specific to a public announcement that has occurred on the aircraft. Further, the users may receive the electronic advertisement shortly (e.g., immediately or within a few seconds) after the public announcement has ended. Therefore, the public announcement may be fresh on the user's mind, so the electronic advertisement related to the public announcement may be of increased usefulness and interest to the user. In another example, the electronic advertisement may not be directly related to the public announcement, but rather may be triggered when the public announcement is finished. For example, passengers on the aircraft may be paying attention to the public announcement, so it may be beneficial to present, display or play the electronic advertisement immediately after the public announcement is finished. The electronic advertisement may also be tailored to the user's demographic, travel itinerary, interests, aircraft information, etc. The electronic advertisement may be selected dynamically and may be personalized for an individual user or group of users. As a result, the electronic advertisements may enhance an experience of the user on the aircraft, as the user may be exposed to more useful and informative information.

Figure 1B:
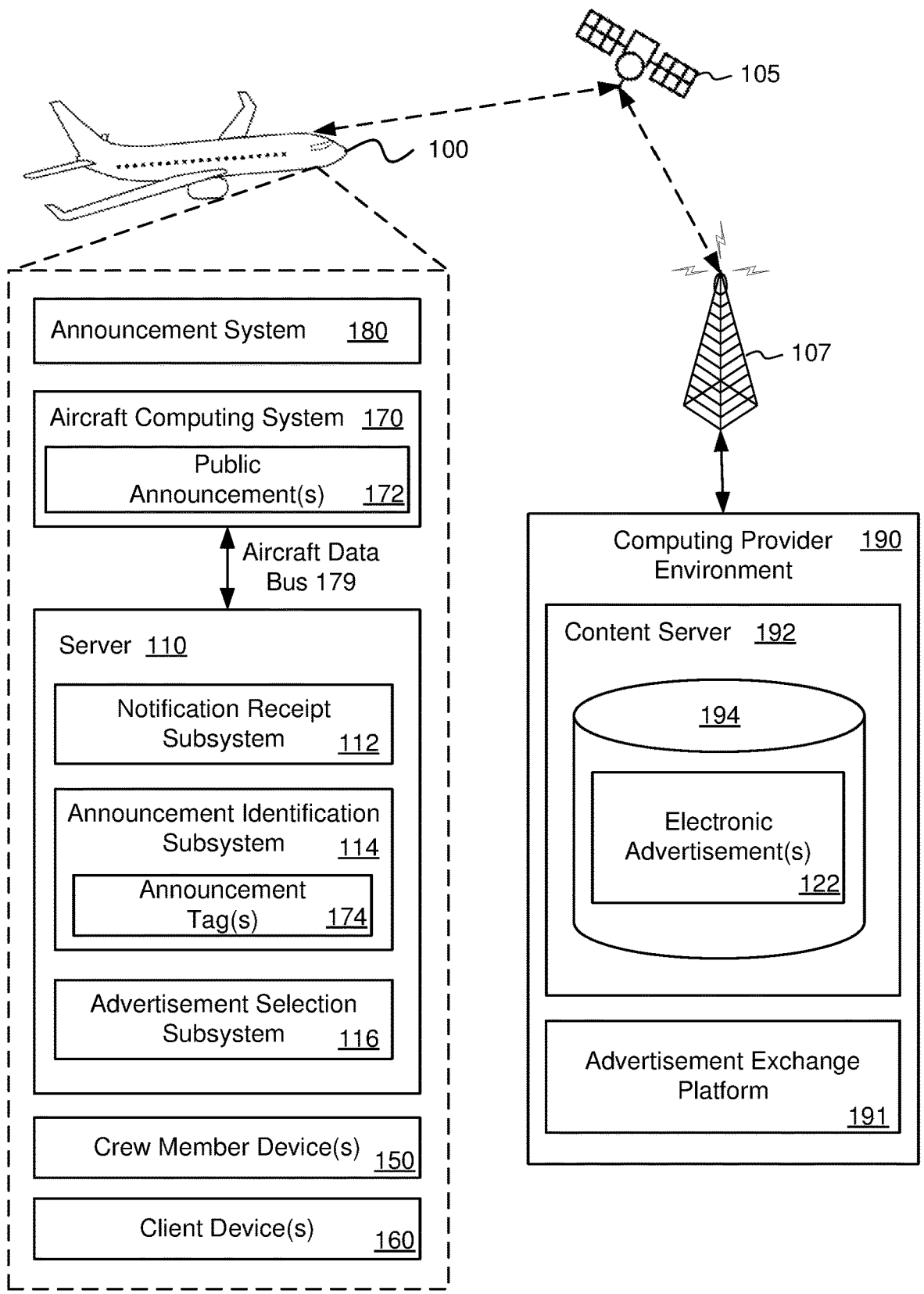
FIG. 1B is a block diagram illustrating a system and related operations for providing electronic advertisements received from a computing provider environment to a client device on an aircraft according to an example of the present technology.

FIG. 1B illustrates an example of a system and related operations for providing electronic advertisements 122 received from a computing provider environment 190 to a client device 160 on an aircraft 100. The computing provider environment 190 may include a public cloud environment, a private cloud environment, a data center, centralized hardware servers, a data warehouse, etc., and the computing provider environment 190 may be external to the aircraft 100. In this configuration, a content server 192 in the computing provider environment 190 may include a data store 194 of electronic advertisements 122. More specifically, the data store 194 of electronic advertisements 122 may not be onboard the aircraft 100.

A server 110 onboard the aircraft 100 may select an electronic advertisement 122 based in part on an announcement tag 174 associated with a public announcement 172, and the server 110 may request the electronic advertisement 122 from the content server 192 in the computing provider environment 190. The server 110 may request the electronic advertisement 122 when the aircraft 100 is in the air. The server 110 on the aircraft 100 may communicate with the content server 192 in the computing provider environment 190 via a satellite 105 and a ground station 107. For example, communications from the server 110 may go to the satellite 105 and then to the content server 192 via the ground station 107, and vice versa. The content server 192 in the computing provider environment 190 may respond with the requested electronic advertisement 122, and the server 110 onboard the aircraft 100 may send the electronic advertisement 122 to the client device 160. In this configuration, the electronic advertisements 122 are not stored locally on the aircraft 100, but rather in the computing provider environment 190. In another example, the server 110 may include a cache to store a limited number of electronic advertisements 122 locally on the aircraft 100, and the cache may be periodically updated with additional electronic advertisements 122 received from the computing provider environment 190.

In one example, the server 110 may select the electronic advertisement 122 from an off-board advertisement exchange platform 191 that operates in the computing provider environment 190. Therefore, in this example, the electronic advertisement 122 may be transmitted from the off-board advertisement exchange platform 191 to the server 110 onboard the aircraft 100, and the electronic advertisement 122 may be forwarded to the client device 160. Alternatively, the electronic advertisement 122 may be transmitted from the off-board advertisement exchange platform 191 to the client device 160 while bypassing the server 110.

Figure 2A:
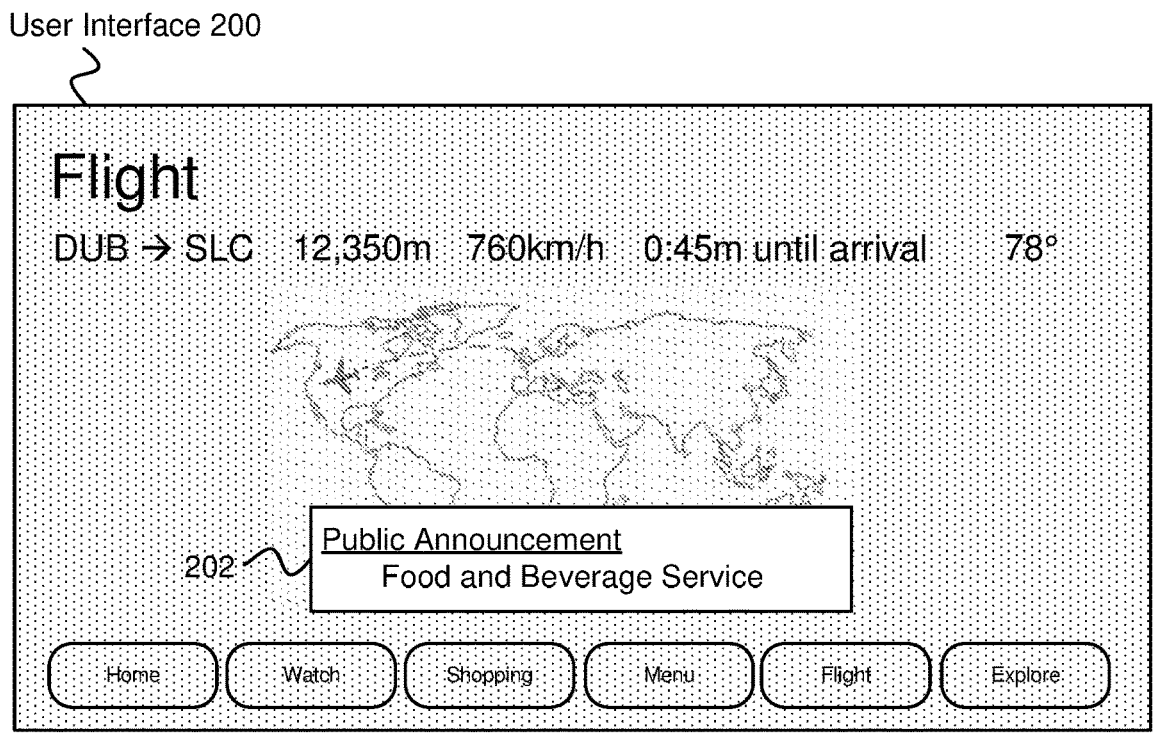
FIG. 2A illustrates a user interface that displays an indication that a public announcement is occurring on an aircraft according to an example of the present technology.

FIG. 2A illustrates an example of a user interface 200 that displays an indication 202 that a public announcement is occurring on an aircraft. The user interface 200 may be provided to a client device onboard the aircraft. In this example, a user associated with the client device may view or interact with a moving map, which may be displayed via the user interface 200. When the public announcement is occurring on the aircraft, the moving map may be paused and the indication 202 may be displayed as an overlay control or a system controlled graphical window (i.e., the user cannot interact with the graphical window or control) on the moving map. The indication 202 may indicate that the public announcement is currently taking place on the aircraft. In addition, the indication 202 may include a tag associated with the public announcement. In this particular example, the indication 202 may indicate that a public announcement related to a food and beverage service is currently taking place on the aircraft. The user may be unable to interact with the moving map displayed on the user interface 200 while the indication 202 is displayed. After the public announcement ends on the aircraft, the indication 202 may be removed by the client device as instructed by a server on the aircraft and the user may be able to interact with the moving map via the user interface 200.

Figure 2B:
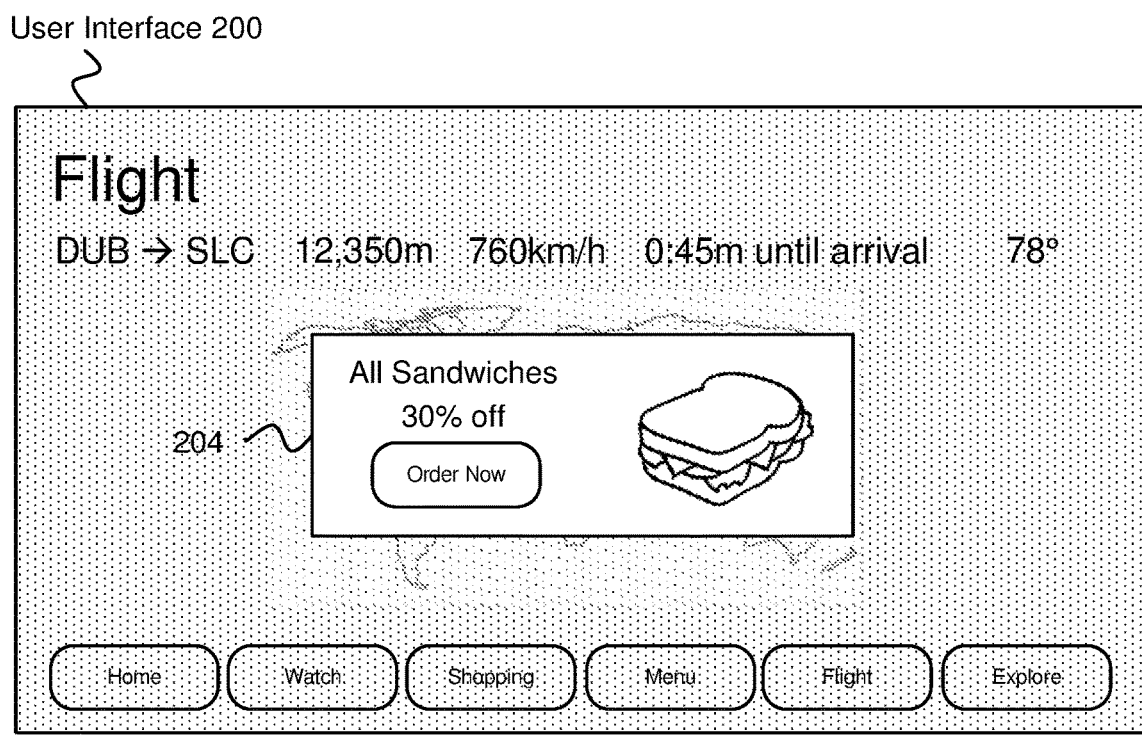
FIG. 2B illustrates a user interface that displays an electronic advertisement after a public announcement has occurred on an aircraft according to an example of the present technology.

FIG. 2B illustrates an example of a user interface 200 that displays an electronic advertisement 204 after a public announcement has occurred on an aircraft. In this example, the electronic advertisement 204 may be displayed via the user interface 200 of the client device after the indication 202 about the public announcement has been removed from the user interface 200. As previously explained, the indication 202 may have been removed after the public announcement has ended or finished on the aircraft. The electronic advertisement 204 displayed on the user interface 200 may or may not relate to the public announcement. In this example, the electronic advertisement 204 may be related to a promotion for sandwiches on the aircraft since the indication 202 indicated that the public announcement was related to a food and beverage service. In one example, after the electronic advertisement 204 is displayed, the user associated with the client device may select the electronic advertisement 204. For example, upon selecting the electronic advertisement 204 on the user interface 200, the user may be directed to an electronic page with additional information or an ordering interface. Alternatively, the user may close the electronic advertisement 204 and continue interacting with the moving map displayed via the user interface 200.

In the non-limiting example in FIGS. 2A and 2B, the indication 202 and the electronic advertisement 204 are displayed on the user interface 200 while the user is using a moving map. However, in other examples, the indication 202 and the electronic advertisement 204 may be displayed on the user interface 200 while the user is watching a movie or television program, playing an electronic game, listening to music, reading an electronic book, viewing an electronic menu, interacting with a shopping channel, etc. via the user interface 200.

Figure 2C:
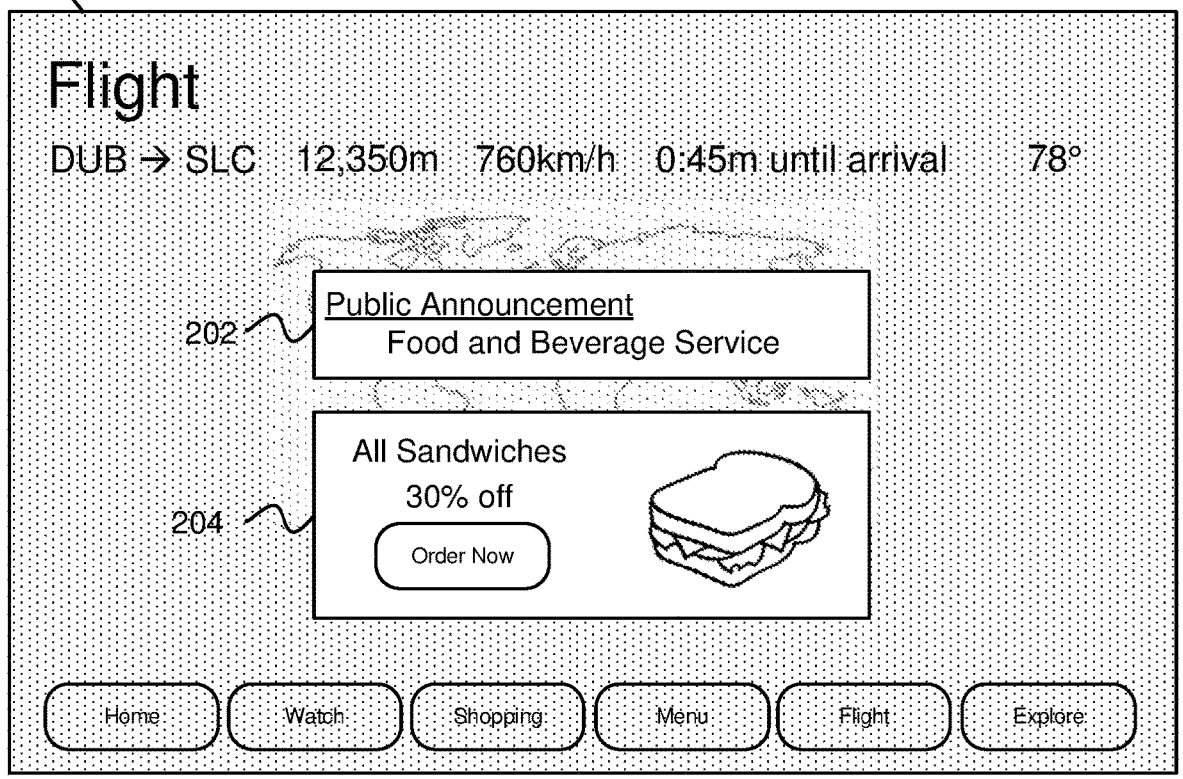
FIG. 2C illustrates a user interface that displays an electronic advertisement along with a public announcement on an aircraft according to an example of the present technology.

FIG. 2C illustrates an example of a user interface 200 that displays an electronic advertisement 204 along with a public announcement on an aircraft. In this example, the electronic advertisement 204 may be displayed via the user interface 200 of the client device while the indication 202 while the public announcement is displayed or presented via the user interface 200.

Figure 3:
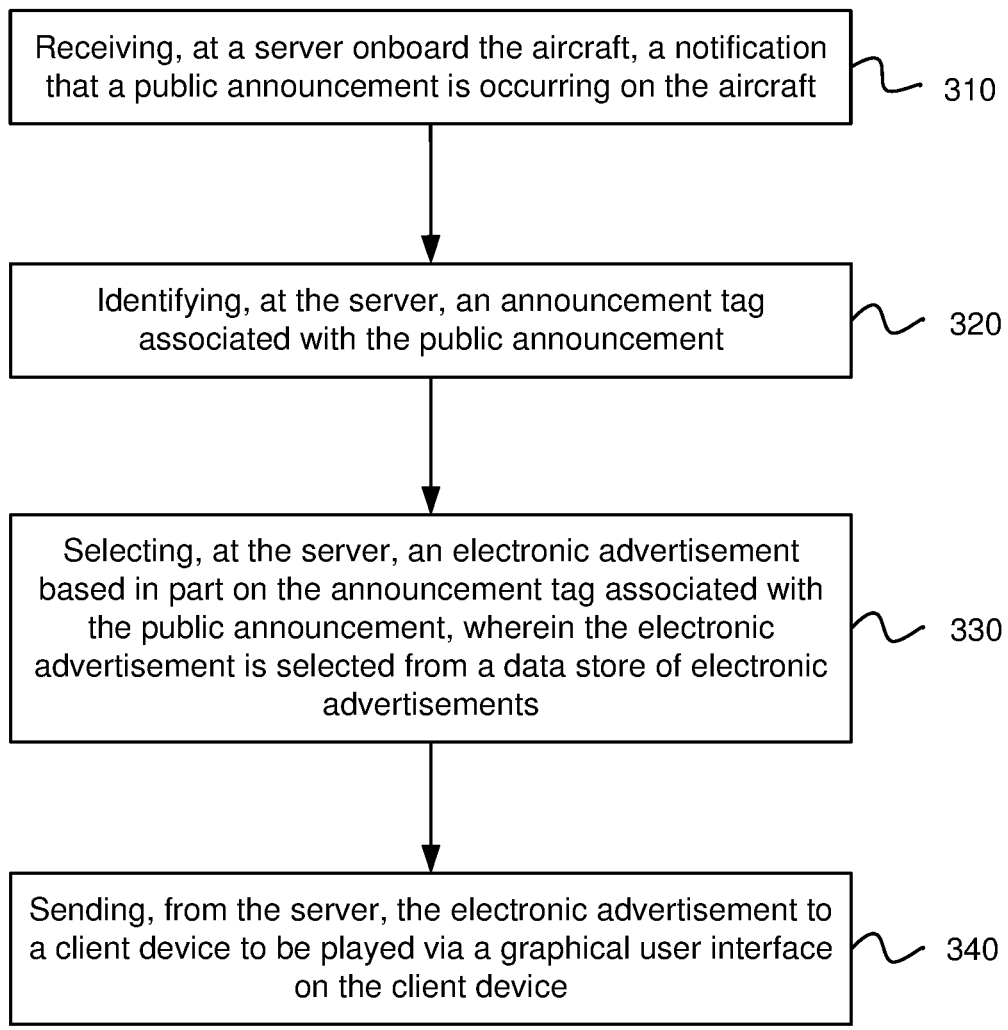
FIG. 3 is a flowchart of an example method for providing electronic advertisements on an aircraft.

FIG. 3 illustrates an example of a method for providing electronic advertisements on an aircraft. The electronic advertisement may be for a product, a service, an offer or a promotion. The electronic advertisements may be delivered by a server on the aircraft to a client device on the aircraft.

A server onboard the aircraft may receive a notification that a public announcement is occurring on the aircraft, as in block 310. For example, the notification that the public announcement is occurring on the aircraft may be received from an aircraft data bus. In one example, the public announcement may be manually triggered by a crew member onboard the aircraft. In another example, the public announcement may be automatically triggered on the aircraft based on a preselected time or after occurrence of a preselected aircraft event on the aircraft. The media content being delivered to the client device may be paused when the public announcement is occurring on the aircraft.

An announcement tag associated with the public announcement may be identified at the server, as in block 320. The announcement tag may include a descriptor for the public announcement, a category associated with the public announcement and/or an attribute associated with the public announcement. For example, the announcement tag may be received from an aircraft data bus. In another example, the announcement tag may be received from an application executing on a crew member device.

An electronic advertisement may be selected at the server based in part on the announcement tag associated with the public announcement, as in block 330. The electronic advertisement may be selected from a data store of electronic advertisements. The data store of electronic advertisements may be located onboard the aircraft.

In one example, the electronic advertisement may be selected from the data store using inventory information that indicates a current inventory of products available on the aircraft, where the selected electronic advertisement may be for a product included on the current inventory of products available on the aircraft. In another example, the electronic advertisement may be selected from the data store using the announcement tag and at least one of: a user travel origin, a user travel destination, an aircraft origin, an aircraft destination, an estimated arrival time, an arrival gate, a current latitude and longitude of the aircraft, an aircraft speed, user dates of travel, a user ticket purchase class, a user seat location, a time of travel, a day of the week of travel, a total duration of a trip, a user ticket price, or a time between a flight booking time and an actual flight time. In yet another example, the electronic advertisement may be selected from the data store using the announcement tag and user information from a user profile that includes interest information of a user and demographic information of the user, where the interest information may include a behavioral attribute of the user.

The electronic advertisement may be sent from the server to the client device to be displayed via a graphical user interface on the client device after the public announcement is finished, as in block 340. Further, a notification may be sent to the client device for display that indicates the public announcement is occurring and the announcement tag associated with the public announcement.

Figure 4:
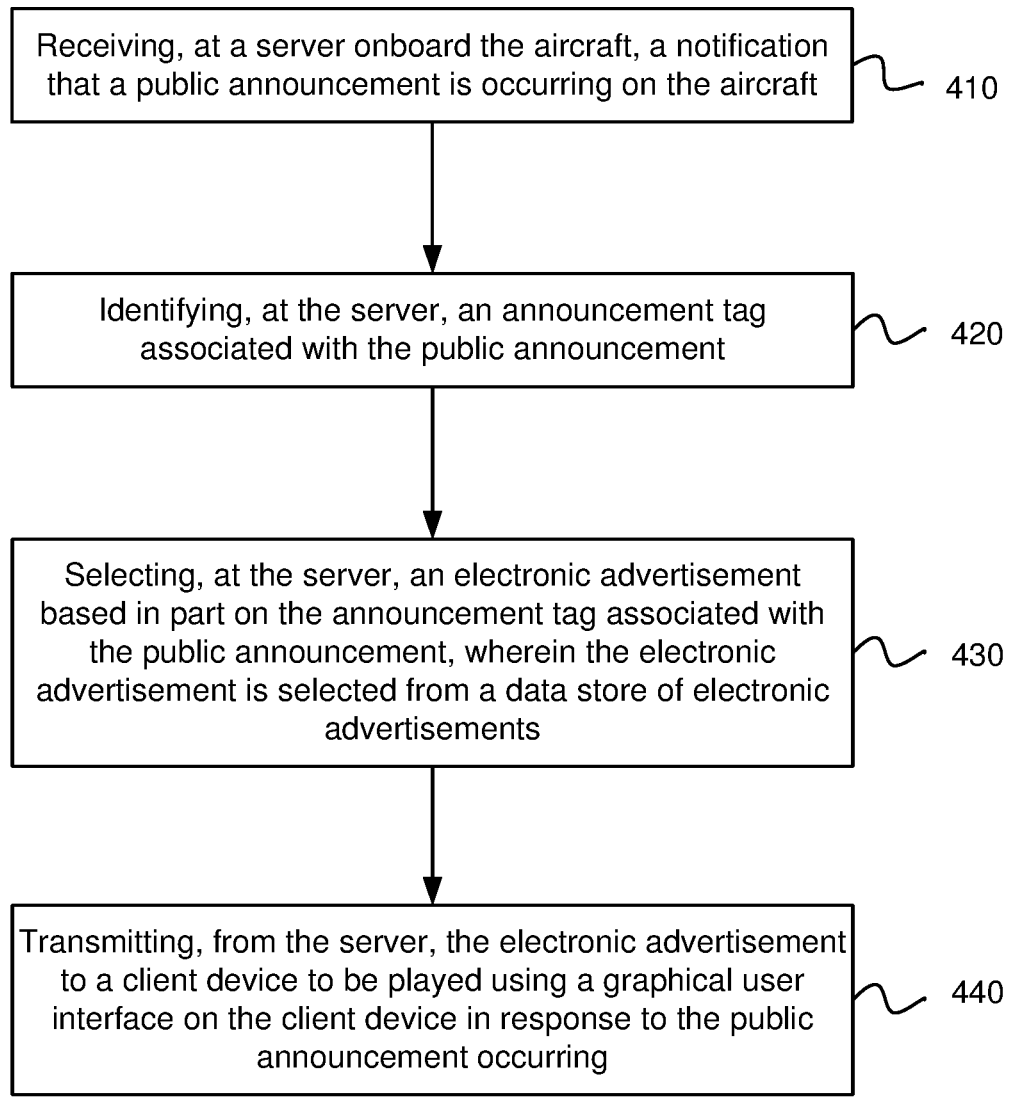
FIG. 4 is a flowchart of another example method for providing electronic advertisements on an aircraft.

FIG. 4 illustrates an example of a method for providing electronic advertisements on an aircraft. A server onboard the aircraft may receive a notification that a public announcement is occurring on the aircraft, as in block 410. The public announcement may be a food and beverage announcement, a boutique and duty free announcement, a pre-landing announcement, a safety announcement, a pilot announcement, or a turbulence announcement.

An announcement tag associated with the public announcement may be identified at the server, as in block 420. The announcement tag may include a descriptor for the public announcement, a category associated with the public announcement and/or an attribute associated with the public announcement. In one example, the announcement tag associated with the public announcement may be received from an aircraft data bus. In another example, the announcement tag associated with the public announcement may be received via an application executing on a crew member device, as directed by a crew member.

An electronic advertisement may be selected at the server based in part on the announcement tag associated with the public announcement, as in block 430. The electronic advertisement may be selected from a data store of electronic advertisements. In one example, the electronic advertisement may be selected based on the announcement tag and using user information as discussed earlier. The user information may include a user profile and/or user travel information. Further, the electronic advertisement may be selected based on the announcement tag and using aircraft information.

The electronic advertisement may be transmitted from the server to a client device to be displayed via a graphical user interface on the client device, as in block 440. The electronic advertisement may be displayed after the public announcement is finished, or alternatively, while the public announcement is occurring.

Figure 5:
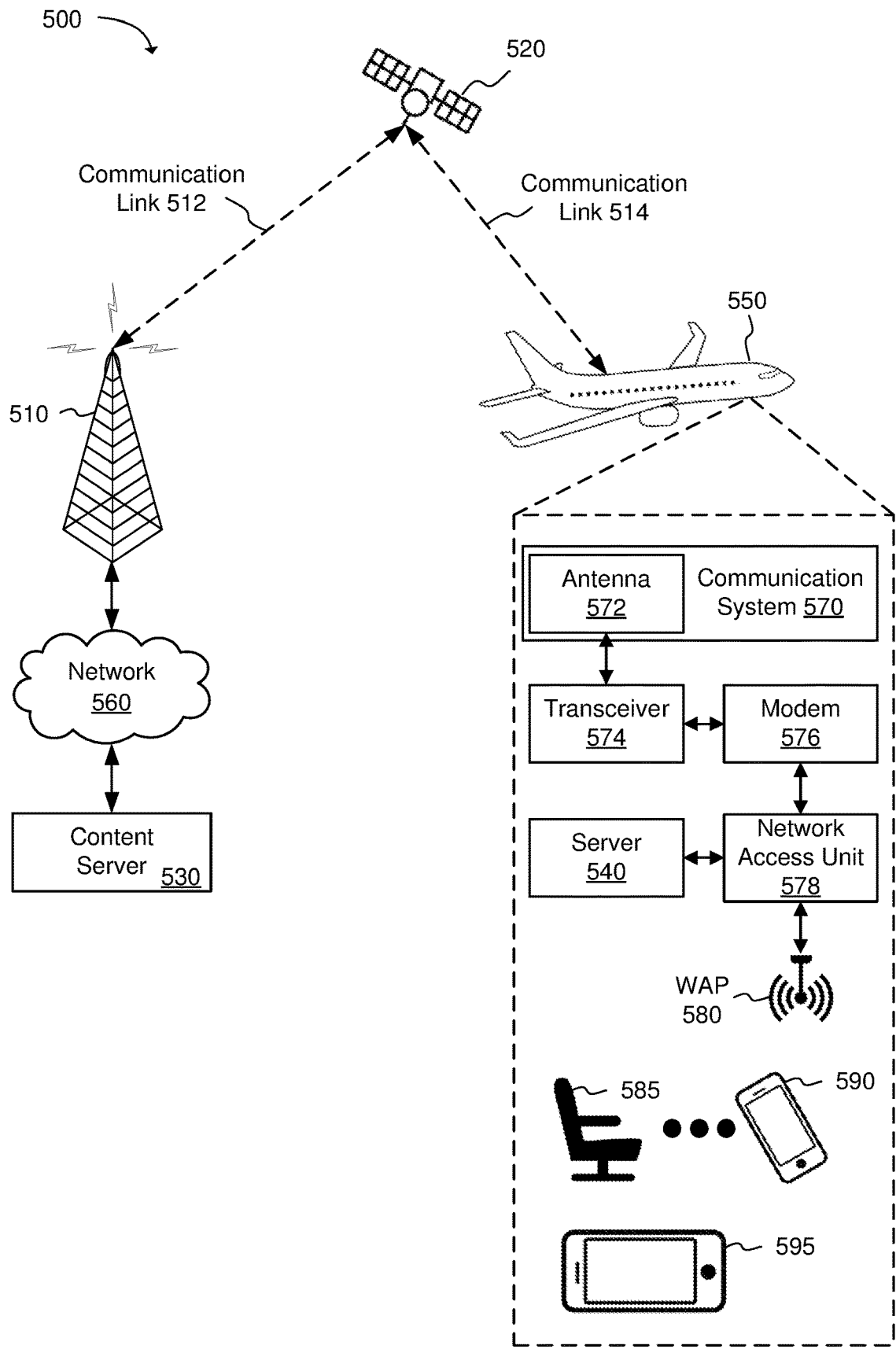
FIG. 5 is a satellite communication system according to an example of the present technology.

FIG. 5 illustrates an example of a satellite communication system 500. The satellite communication system 500 may include satellite(s) 520 in bidirectional communication with a ground station 510 via a communication link 512 between the satellite 520 and the ground station 510. The satellite 520 may also be in bidirectional communication with an aircraft 550 (e.g., an airplane, helicopter, blimp or balloon) via a communication link 514 between the satellite 520 and the aircraft 550. The communication link 512 and the communication link 514 may enable communication between the aircraft 550 and the ground station 510 via the satellite 520 while the aircraft 550 is stationary or in motion.

In one example, the satellite communication system 500 may include multiple satellites 520, where each satellite 520 may provide coverage for a service area, and service areas for different satellites may be non-overlapping or overlapping. The satellite communication system 500 may be any suitable type of satellite system, including a geostationary satellite system, medium earth orbit satellite system, low earth orbit satellite system, or combinations thereof. The satellite 520 may have a number of beams directed at different regions on Earth, where the coverage area of each beam may be non-overlapping or overlapping with one or more other beams. The satellite 520 may have one or more spot beams covering different regions on Earth within the service area of the satellite 520. As another example, the satellite 520 may have one or more wide area coverage beams covering the service area of the satellite 520. As yet another example, the satellite 520 may have a combination of spot beams and wide area coverage beams.

In one configuration, the aircraft 550 may include a communication system 570 to facilitate bidirectional communication with the satellite 520 via the communication link 514. The communication system 570 may include an antenna 572 to receive a downlink signal from the satellite 520 and transmit an uplink signal to the satellite 520 via the communication link 514. The aircraft 550 may include a transceiver 574 in communication with the antenna 572, a modem 576 in communication with the transceiver 574, a network access unit 578 (e.g., a router) in communication with the modem 576, and a wireless access point (WAP) 580 in communication with the network access unit 578. Further, the wireless access point 580 may communicate with one or more client devices in the aircraft 550, such as seatback systems 585 and/or client devices 590 (e.g., mobile phones, tablets, laptops) in the aircraft 550. Therefore, the communication system 570 may receive a downlink signal from the satellite 520 and forward the downlink signal to the client devices, and receive an uplink signal from the client devices and forward the uplink signal to the satellite 520, thereby supporting two-way data communications between the client devices within the aircraft 550 and the satellite 520. In addition, the wireless access point 580 may communicate with one or more crew member devices 595.

In one configuration, the network access unit 578 may be in communication with a server 540 (such as the server 110 described earlier) onboard the aircraft 550. The server 540 may receive a notification that a public announcement is occurring on the aircraft 550. The server 540 may identify an announcement tag associated with the public announcement. The announcement tag may include a descriptor for the public announcement. The server 540 may select an electronic advertisement based in part on the announcement tag associated with the public announcement. The electronic advertisement may be selected from a data store of electronic advertisements. The server 540 may send the electronic advertisement to the client device 590 to be displayed via a graphical user interface on the client device 590 after the public announcement is finished.

In one example, the seatback system 585 may be a fixed or on-aircraft device. The seatback system 585 may communicate with the server 540 via a wired communication link. For example, the seatback system 585 may communicate with the network access unit 578 over a wired communication link, and the network access unit 578 may communicate with the server 540 over a wired communication link. Alternatively, the seatback system 585 may communicate with the server 540 via the network access unit 578 and the wireless access point 580. The seatback system 585 may execute one or more applications that provide an interface for users on the aircraft 550 to obtain and consume data.

In one example, the client device 590 may receive and display data, and may be brought onto the aircraft 550 by users (which include passengers or crew members). The client devices 590 may execute one or more applications that provide the interface for users to obtain and consume data. The user may have the option to select/request data for viewing from the interface. When a user interacts with the client device 590, the client device 590 may transmit a request for data to the network access unit 578 via the wireless access point 580. The client device 590 may receive requested data from the network access unit 578 via the wireless access point 580. Thus, the wireless access point 580 may provide communication between the network access unit 578 and personal electronic device 590.

In one example, the network access unit 578 may receive requests for data from the client device 590 via the wireless access point 580 and multiplex and forward the requests to the modem 576. The network access unit 578 may receive and demultiplex packets associated with the data, and forward the data to the client device 590 via the wireless access point 580.

In one example, the modem 576 may receive requests for data from the network access unit 578, and the modem 576 may generate modulated data (e.g., a transmit intermediate frequency (IF) signal) for delivery to the transceiver 574. Further, the modem 576 may receive requested data as a modulated data (e.g., a receive intermediate frequency (IF) signal) from the transceiver 574 and demodulate that data for transmission to the network access unit 578. In one example, the modem 576 may be integrated with the network access unit 578, or alternatively, the modem 576 and the network access unit 578 may be separate components.

In one example, the transceiver 574 may up-convert and amplify modulated data received from the modem 576 to generate an uplink signal for transmission to the satellite 520 via the antenna 572. Similarly, the transceiver 574 may receive a downlink signal from the satellite 520 via the antenna 572. The transceiver 574 may then amplify and down-convert the downlink signal to generate modulated downlink data (e.g., a receive IF signal) for demodulation by the modem 576.

In one example, the ground station 510 may also be referred to as an access node, a hub or a gateway. The ground station 510 may include an antenna to transmit an uplink signal to the satellite 520 and receive a downlink signal from the satellite 520. The ground station 510 may be in communication with a content server 530 via a network 560. The content server 530 may include electronic advertisements, media content, web content, etc.

In one example, the network 560 may be any type of network and may include for example, an internet, an internet protocol (IP) network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. The network 560 may include both wired and wireless connections as well as optical links.

In one example, the ground station 510 may be provided as an interface between the network 560 and the satellite 520. The ground station 510 may receive data and information directed to the seatback system 585 and/or the client device 590 onboard the aircraft 550 from the content server 530 accessible via the network 560. The ground station 510 may format the data and information and transmit an uplink signal to the satellite 520 for subsequent delivery to the aircraft 550 (and then the seatback system 585 and/or the client device 590). Similarly, the ground station 510 may be receive a downlink signal from the satellite 520 (e.g., containing requests, data and/or information originating from the seatback system 585 and/or the client device 590 on the aircraft 550) that is directed to a destination accessible via the network 560. The ground station 510 may format the received downlink signal for transmission on the network 560.

In one configuration, the seatback system 585 and/or the client device 590 may be onboard the aircraft 550. Alternatively, the seatback system 585 and/or the client device 590 may be onboard other types of vehicles, such as trains, automobiles (e.g., cars, trucks, busses, etc.), watercraft (e.g., private boats, commercial shipping vessels, cruise ships, etc.) and others.

Figure 6:
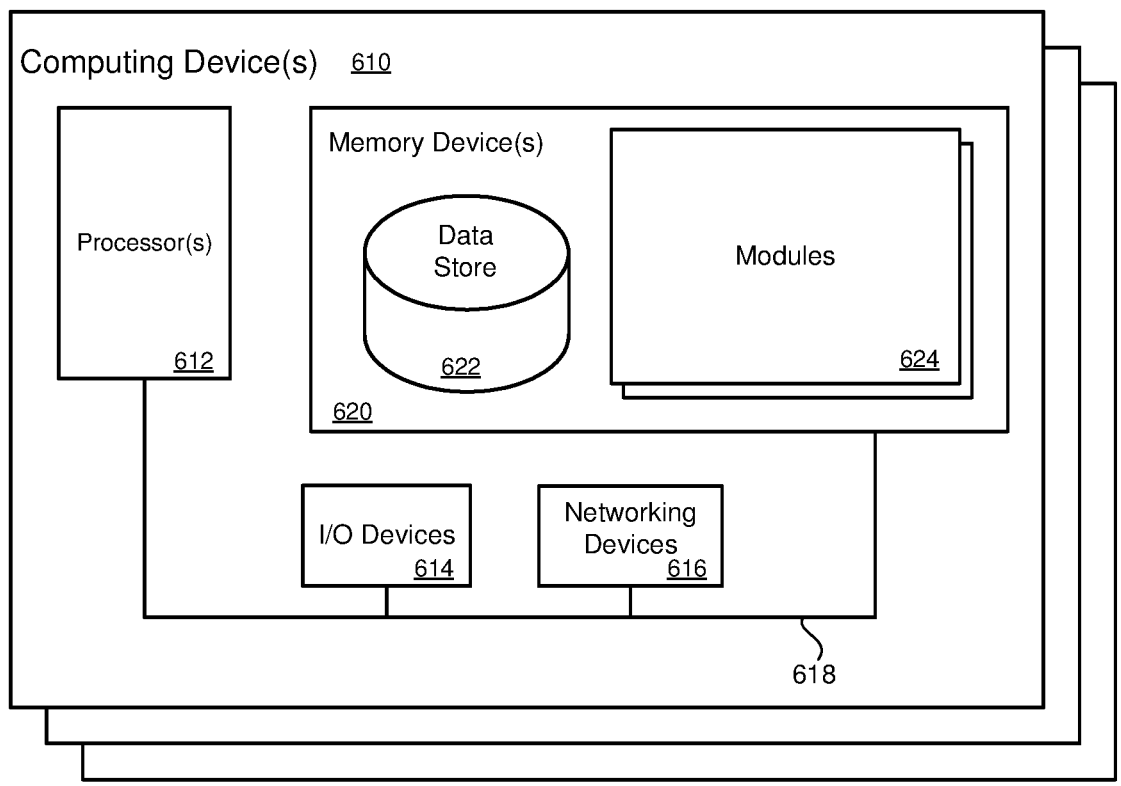
FIG. 6 is a block diagram that provides an example illustration of a computing device that may be employed in the present technology.

FIG. 6 illustrates a computing device 610 which may execute the foregoing subsystems of this technology. The computing device 610 and the components of the computing device 610 described herein may correspond to the servers, client devices and/or the crew member devices described above. The computing device 610 is illustrated on which a high level example of the technology may be executed. The computing device 610 may include one or more processors 612 that are in communication with memory devices 620. The computing device may include a local communication interface 618 for the components in the computing device. For example, the local communication interface may be a local data bus and/or any related address or control busses as may be desired.

The memory device 620 may contain modules 624 that are executable by the processor(s) 612 and data for the modules 624. The modules 624 may execute the functions described earlier. A data store 622 may also be located in the memory device 620 for storing data related to the modules 624 and other applications along with an operating system that is executable by the processor(s) 612.

Other applications may also be stored in the memory device 620 and may be executable by the processor(s) 612. Components or modules discussed in this description that may be implemented in the form of software using high programming level languages that are compiled, interpreted or executed using a hybrid of the methods.

The computing device may also have access to I/O (input/output) devices 614 that are usable by the computing devices. An example of an I/O device is a display screen that is available to display output from the computing devices. Other known I/O device may be used with the computing device as desired. Networking devices 616 and similar communication devices may be included in the computing device. The networking devices 616 may be wired or wireless networking devices that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface 618 may be used as a network to facilitate communication between any of the multiple processors and multiple memories. The local interface 618 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

In describing the present technology, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited.

As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for providing electronic advertisements on an aircraft, comprising:
   receiving, at a server onboard the aircraft, a notification that a public announcement is occurring on the aircraft, wherein the notification that the public announcement is occurring on the aircraft is received from an aircraft data bus;
   identifying, at the server, an announcement tag associated with the public announcement in response to receiving the notification that the public announcement is occurring on the aircraft;
   selecting, at the server, an electronic advertisement based in part on the announcement tag associated with the public announcement, wherein the electronic advertisement is selected from a data store of electronic advertisements; and sending, from the server, the electronic advertisement to a client device to be presented via a graphical user interface on the client device.

2. The method of claim 1, further comprising receiving the announcement tag for the public announcement at the server from an aircraft data bus.

3. The method of claim 1, further comprising receiving the announcement tag for the public announcement from an application executing on a crew member device, wherein the application is controlled by a crew member.

4. The method of claim 1, further comprising pausing media content being delivered to the client device when the public announcement is occurring on the aircraft.

5. The method of claim 1, wherein the electronic advertisement is selected from the data store of electronic advertisements using inventory information that indicates a current inventory of products available on the aircraft, wherein the electronic advertisement is for a product included in the current inventory of products available on the aircraft.

6. The method of claim 1, wherein the electronic advertisement is selected from the data store of electronic advertisements using the announcement tag associated with the public announcement and at least one of: a user travel origin, a user travel destination, an aircraft origin, an aircraft destination, an estimated arrival time, an arrival gate, a current latitude and longitude of the aircraft, an aircraft speed, user dates of travel, a user ticket purchase class, a user seat location, a time of travel, a day of the week of travel, a total duration of a trip, a user ticket price, or a time between a flight booking time and an actual flight time.

7. The method of claim 1, wherein the electronic advertisement is selected from the data store of electronic advertisements using the announcement tag associated with the public announcement and user information from a user profile that includes interest information of a user and demographic information of the user, wherein the interest information includes a behavioral attribute of the user.

8. The method of claim 1, wherein the public announcement is at least one of: a food and beverage announcement, a boutique and duty free announcement, a pre-landing announcement, a safety announcement, a pilot announcement, or a turbulence announcement.

9. The method of claim 1, wherein the public announcement is manually triggered by a crew member onboard the aircraft.

10. The method of claim 1, wherein the public announcement is automatically triggered on the aircraft at a preselected time or after occurrence of an aircraft event on the aircraft.

11. The method of claim 1, wherein the electronic advertisement is for at least one of: a product, a service, an offer or a promotion.

12. The method of claim 1, wherein a connection between the server and the client device is a wireless connection established via a wireless access point onboard the aircraft.

13. The method of claim 1, wherein the data store of electronic advertisements is located onboard the aircraft.

14. The method of claim 1, wherein the client device is a personal electronic device.

15. The method of claim 1, wherein the client device is a seatback system on the aircraft, and a connection between the server and the seatback system is a wired or wireless connection.

16. The method of claim 1, wherein the announcement tag associated with the public announcement includes one or more of: a descriptor for the public announcement, a category associated with the public announcement, or attributes associated with the public announcement.

17. A non-transitory machine readable storage medium having instructions embodied thereon, the instructions when executed by one or more processors, cause the one or more processors to perform a process including:
   receiving, at a server onboard an aircraft, a notification that a public announcement is occurring on the aircraft, wherein the notification that the public announcement is occurring on the aircraft is received from an aircraft data bus;
   identifying, at the server, an announcement tag associated with the public announcement in response to receiving the notification that the public announcement is occurring on the aircraft;
   selecting, at the server, an electronic advertisement based in part on the announcement tag associated with the public announcement, wherein the electronic advertisement is selected from a data store of electronic advertisements; and
   sending, from the server, the electronic advertisement to a client device to be presented using a graphical user interface on the client device.

18. The non-transitory machine readable storage medium of claim 17, wherein the electronic advertisement is transmitted to the client device to be displayed immediately after the public announcement is finished.

19. The non-transitory machine readable storage medium of claim 17, wherein the announcement tag associated with the public announcement is received from an aircraft data bus.

20. The non-transitory machine readable storage medium of claim 17, wherein the announcement tag associated with the public announcement is received via an application executing on a crew member device, wherein the application is controlled by a crew member.

21. The non-transitory machine readable storage medium of claim 17, further comprising: pausing media content being delivered to the client device when the public announcement is occurring on the aircraft.

22. The non-transitory machine readable storage medium of claim 17, wherein the electronic advertisement is selected from the data store of electronic advertisements using inventory information that indicates a current inventory of products available on the aircraft, wherein the electronic advertisement is for a product included in the current inventory of products available on the aircraft.

23. The non-transitory machine readable storage medium of claim 17, wherein the electronic advertisement is selected from the data store of electronic advertisements based on the announcement tag associated with the public announcement and using at least one of: a user travel origin, a user travel destination, an aircraft origin, an aircraft destination, an estimated arrival time, an arrival gate, a current latitude and longitude of the aircraft, an aircraft speed, user dates of travel, a user ticket purchase class, a user seat location, a time of travel, a day of the week of travel, a total duration of a trip, a user ticket price, or a time between a flight booking time and an actual flight time.

24. The non-transitory machine readable storage medium of claim 17, wherein the electronic advertisement is selected from the data store of electronic advertisements based on the announcement tag associated with the public announcement and user information from a user profile that includes interest information of a user and demographic information of the user, wherein the interest information includes a behavioral attribute of the user.

25. The non-transitory machine readable storage medium of claim 17, wherein the public announcement is at least one of: a food and beverage announcement, a boutique and duty free announcement, a pre-landing announcement, a safety announcement, a pilot announcement, or a turbulence announcement.

26. The non-transitory machine readable storage medium of claim 17, wherein the public announcement is manually triggered by a crew member onboard the aircraft.

27. The non-transitory machine readable storage medium of claim 17, wherein the public announcement is automatically triggered on the aircraft at a preselected time or after occurrence of an aircraft event on the aircraft.

28. The non-transitory machine readable storage medium of claim 17, wherein the electronic advertisement is for at least one of: a product, a service, an offer or a promotion.

29. The non-transitory machine readable storage medium of claim 17, wherein a connection between the server and the client device is a wireless connection established via a wireless access point onboard the aircraft.

30. The non-transitory machine readable storage medium of claim 17, wherein the data store of electronic advertisements is located onboard the aircraft.

31. The non-transitory machine readable storage medium of claim 17, wherein the client device is a personal electronic device.

32. The non-transitory machine readable storage medium of claim 17, wherein the client device is a seatback system on the aircraft, and a connection between the server and the seatback system is a wired or wireless connection.

33. The non-transitory machine readable storage medium of claim 17, wherein the announcement tag associated with the public announcement includes one or more of: a descriptor for the public announcement, a category associated with the public announcement, or attributes associated with the public announcement.

34. A system, comprising:
   at least one processor;
   at least one memory device including a data store to store a plurality of data and instructions that, when executed, cause the system to:
   receive a notification that a public announcement is occurring on an aircraft, wherein the notification that the public announcement is occurring on the aircraft is received from an aircraft data bus;
   identify an announcement tag associated with the public announcement in response to receiving the notification that the public announcement is occurring on the aircraft;
   select an electronic advertisement based in part on the announcement tag associated with the public announcement, wherein the electronic advertisement is selected from a data store of electronic advertisements; and
   send the electronic advertisement to a client device to be displayed via a graphical user interface on the client device.

35. The system of claim 34, wherein the announcement tag associated with the public announcement is received via an application executing on a crew member device, wherein the application is controlled by a crew member.

36. The system of claim 34, wherein the plurality of data and instructions, when executed, cause the system to: pause media content being delivered to the client device when the public announcement is occurring on the aircraft.

37. The system of claim 34, wherein the electronic advertisement is selected from the data store of electronic advertisements using inventory information that indicates a current inventory of products available on the aircraft, wherein the selected electronic advertisement is for a product included in the current inventory of products available on the aircraft.

38. The system of claim 34, wherein the electronic advertisement is selected from the data store of electronic advertisements based on the announcement tag associated with the public announcement and using at least one of: a user travel origin, a user travel destination, an aircraft origin, an aircraft destination, an estimated arrival time, an arrival gate, a current latitude and longitude of the aircraft, an aircraft speed, user dates of travel, a user ticket purchase class, a user seat location, a time of travel, a day of the week of travel, a total duration of a trip, a user ticket price, or a time between a flight booking time and an actual flight time.

39. The system of claim 34, wherein the electronic advertisement is selected from the data store of electronic advertisements based on the announcement tag associated with the public announcement and user information from a user profile that includes interest information of a user and demographic information of the user, wherein the interest information includes a behavioral attribute of the user.

40. The system of claim 34, wherein the public announcement is at least one of: a food and beverage announcement, a boutique and duty free announcement, a pre-landing announcement, a safety announcement, a pilot announcement, or a turbulence announcement.

41. The system of claim 34, wherein the public announcement is manually triggered by a crew member onboard the aircraft.

42. The system of claim 34, wherein the public announcement is automatically triggered on the aircraft at a preselected time or after occurrence of an aircraft event on the aircraft.

43. The system of claim 34, wherein the electronic advertisement is for at least one of: a product, a service, an offer or a promotion.

44. The system of claim 34, wherein a connection between a server and the client device is a wireless connection established via a wireless access point onboard the aircraft.

45. The system of claim 34, wherein the data store of electronic advertisements is located onboard the aircraft.

46. The system of claim 34, wherein the client device is a personal electronic device.

47. The system of claim 34, wherein the client device is a seatback system on the aircraft, and a connection between a server and the seatback system is a wired or wireless connection.

48. The system of claim 34, wherein the announcement tag associated with the public announcement includes one or more of: a descriptor for the public announcement, a category associated with the public announcement, or attributes associated with the public announcement.

* * * * *